United States Patent [19]

Belart

[11] 4,309,935

[45] Jan. 12, 1982

[54] TWO CIRCUIT VACUUM BRAKE BOOSTER

[75] Inventor: Juan Belart, Walldorf, Fed. Rep. of Germany

[73] Assignee: ITT Industries, Inc., New York, N.Y.

[21] Appl. No.: 122,096

[22] Filed: Feb. 19, 1980

[30] Foreign Application Priority Data

Mar. 5, 1979 [DE]   Fed. Rep. of Germany ....... 2908481

[51] Int. Cl.³ .......................... F15B 9/10; F01B 19/00
[52] U.S. Cl. ...................................... 91/376 R; 92/48; 91/509
[58] Field of Search ............................ 92/48, 49, 97; 91/189 R, 369 R, 369 A, 369 B, 376 R, 508, 509, 523, 510

[56] References Cited

U.S. PATENT DOCUMENTS

| | | | |
|---|---|---|---|
| 3,482,485 | 12/1969 | Abbott | 91/376 R |
| 3,813,992 | 6/1974 | Brown | 91/369 B |
| 4,007,664 | 2/1977 | Popp | 91/369 B |

Primary Examiner—Paul E. Maslousky
Attorney, Agent, or Firm—John T. O'Halloran; Alfred C. Hill

[57] ABSTRACT

A two-circuit vacuum brake booster in which two pressure chambers are disposed in tandem with respect to each other, are atmospherically separated from each other and are controlled by its own valve arrangement. The two valve arrangements are arranged in a single control hub one behind the other and are simultaneously controlled since their pistons are mechanically rigidly connected with one another.

9 Claims, 1 Drawing Figure

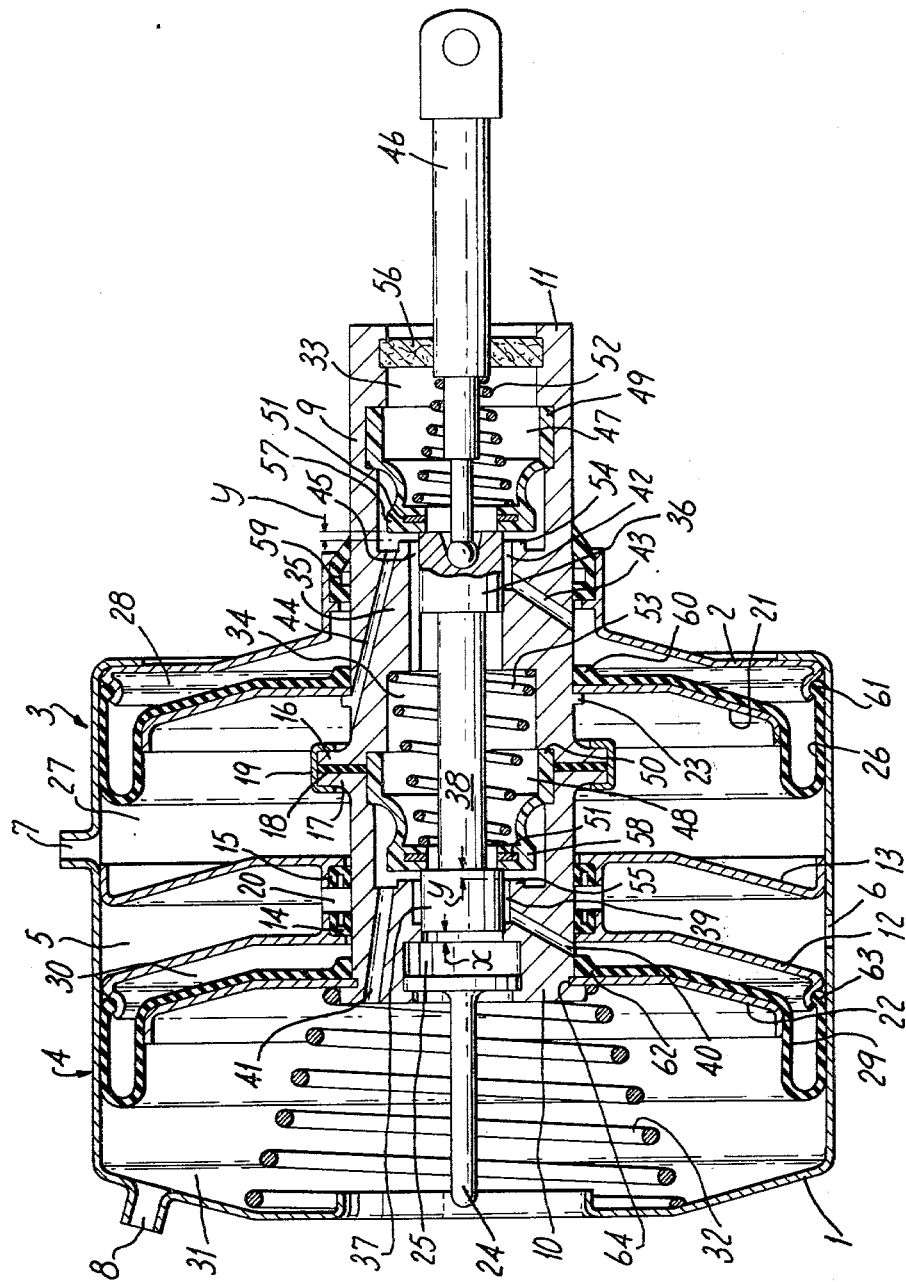

TWO CIRCUIT VACUUM BRAKE BOOSTER

BACKGROUND OF THE INVENTION

The present invention relates to a two-circuit vacuum brake booster which includes two vacuum housings arranged axially behind each other and each provided with at least one wall which is movably arranged therein. The movable walls act on a force-transmitting member and subdivide each of the vacuum housings into a vacuum chamber and a working chamber.

Such a two-circuit vacuum brake booster has come to knowledge from German Pat. No. DE-OS 2,314,792. Each of the movable walls is fastened on a different control hub each of which contains a valve arrangement including a valve piston and a plate valve. The control hubs are designed such that they will penetrate the vacuum and working chambers and will slidingly project from the vacuum housings in an axially sealed manner. The first control hub serves as the air supply to the first valve arrangement and houses the pedal-actuated piston rod which is mechanically connected with the first valve piston. A reaction mechanism adding up the pedal force and the boosting force, which acts on the movable wall, in a predetermined ratio will operate a control rod arranged in the control hub, the control rod acting on the second valve piston in the second control hub. The first control hub slides in a sealed manner in the first vacuum chamber in the second control hub and, thus, a separation of the two vacuum circuits is ensured. A further reaction mechanism will ensure that the boosting force of the second working chamber, together with the force transmitted onto the second valve piston, will act on the force-transmitting member sliding in the second control hub. The support for the reception of the force-transmitting member has a bore which ensures the supply of atmospheric air to the second valve arrangement. Upon actuation of the brake pedal, the axial displacement of the valve piston will provide for the supply of atmospheric air to the first working chamber, the forces that result from the pressure difference moving the first movable wall with the first control hub in the direction of the force-transmitting member. After overcoming of a first dead travel of the first vacuum booster, a piston rod which axially slides in the first control hub will move the second valve piston, atmospheric air also entering the second working chamber due to the air supply from the side of the force-transmitting member. After overcoming of the dead travel of the second vacuum booster, the second movable wall will transmit the forces by which it is acted upon to the force-transmitting member. In this arrangement, the costs are enormous because of the multitude of components. A multitude of seals and springs consume unnecessary energies, while the at times narrow air supply lines tend to rapidly become dirty if the operational surroundings are unfavorable which will result in a derogation of the operation of the vacuum booster.

SUMMARY OF THE INVENTION

It is an object of the present invention to provide a two-circuit vacuum brake booster which will feature a simple design and have a small number of components, thus offering a manufacture at favorable costs, ensuring a high degree of operational reliability, and quickly and safely responding without high energy losses and pedal travels thanks to the reduced number of seals, springs, and dead travels.

A feature of the present invention is the provision of a two-circuit vacuum brake booster comprising a housing having a longitudinal axis; two pressure chambers disposed one behind the other coaxial of the axis within the housing; at least one movable wall disposed in each of the two chambers to divide each of the two chambers into a vacuum chamber and a working chamber, each of the movable walls acting on a force-transmitting member; and a control hub disposed in the housing coaxial of the axis supporting the force-transmitting member and to which each of the movable walls are fastened, the hub having disposed therein a valve and duct system for separate evacuation of and joint supply of atmospheric pressure to the working chamber of each of the two chambers.

Because of the fact that the control hub has but one means of air supply for the pressurizing of the working chambers with air, several filter systems can be eliminated and a cheaper manufacture and service of the booster thus becomes possible.

The fact that in a two-circuit vacuum booster provided with valve arrangements, each coordinated with a working chamber and known per se and including a valve piston, a plate valve and a valve spring, the valve piston being directly operable by the piston rod, which are arranged axially behind each other and the fact that the two valve pistons are rigidly connected with each other by means of a rod will provide for a simultaneous action of the boosting forces of the two vacuum circuits. The operating condition of the vacuum booster corresponding to the pedal position will rapidly and safely be reached since both valves will simultaneously adopt their operationally indicated positions. The direct mechanical force transmission from the pedal to the force-transmitting member will ensure that only one dead travel will have to be overcome.

By providing the first valve piston, which is directly connected with the piston rod, with ducts in its guidance for the passage of air to the second valve arrangement a simple air supply will be ensured to the second valve arrangement.

The structural design of the vacuum booster where the vacuum chambers are arranged in one housing and are separated by an atmospheric intermediate chamber will ensure that the housing of the vacuum booster is of a simple one-piece manufacture and the separation of the two vacuum circuits will be maintained.

The assembly of the control hub from two components will enable a simple mounting of the second valve arrangement. The two components can be put together at the point of separation by threads, clamp fittings or similar means.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross section of a two-circuit vacuum brake booster in accordance with the principles of the present invention.

DESCRIPTION OF THE PREFERRED EMBODIMENT

A cup-shaped housing 1 is closed by means of a cover 2. Two rigid walls 12 and 13 fastened in housing 1 provide two pressure chambers 3 and 4 and a separating chamber 5. Separating chamber 5 communicates with the atmosphere via an opening 6. Pressure chambers 3 and 4 are each connected with non-illustrated vacuum pumps by means of connections 7 and 8, respectively, vacuum pumps being separately-working and serving as energy sources. A control hub 11 rigidly assembled from two components 9 and 10 penetrates cover 2 as well as rigid walls 12 and 13. Walls 12 and 13 are rigidly connected with each other around the circumference of control hub 11. This rigid connection also embraces control hub 11 with radial play. Atmospheric air penetrates through bores 20 until it reaches the circumference of control hub 11. Packing rings 14 and 15 which are positively arranged to the right and to the left of bores 20 in the walls seal pressure chambers 3 and 4 from the atmosphere around the circumference of control hub 11. The two components 9 and 10 join each other in pressure chamber 3. At this joint they are each provided with a circumferential collar 16, 17, the front faces of collars 16, 17 being firmly pressed together by a clamp fitting 19. A seal 18 is inserted between collars 16 and 17. A seal 59 inserted between cover 2 and component 9 seals pressure chamber 3 from the atmosphere. Component 10 of control hub 11 positively embraces a force-transmitting member 24 which is supported at the control hub via a reaction disk 25. The reaction disk 25 at the same time is used as a seal between pressure chamber 4 and the hollow inner chambers 33 and 34 of control hub 11. Force-transmitting member 24 is sealingly led out of housing 1 and axially acts on a non-illustrated master cylinder of a hydraulic brake system. Two further walls 21 and 22 are spaced axially along and fastened to control hub 11. Wall 21 is disposed in pressure chamber 3 and wall 22 is disposed in pressure chamber 4. Wall 21 is positively resting in the direction of force transmission at a surrounding collar 23 of component 9 of control hub 11, while it is held against the direction of force transmission by the inside edge 60 of a rubber diaphragm 26 which is fixed around the circumference of control hub 11, outside edge 61 of diaphragm 26 being clamped between housing 1 and cover 2 and thus dividing pressure chamber 3 into a vacuum chamber 27 and a working chamber 28. Wall 22 disposed in pressure chamber 4 is positively resting in a groove 64 at the head of component 10 in the direction of force transmission as well as against said direction. Pressure chamber 4 is likewise divided by a rubber diaphragm 29 into a working chamber 30 and a vacuum chamber 31. The inside edge 62 of rubber diaphragm 29 firmly embraces the control hub's circumference in working chamber 30, the outside edge being clamped between partition wall 12 and housing 1. Vacuum connections 7 and 8 each are coordinated with vacuum chambers 27 and 31. In vacuum chamber 31 a spring 32 acts against the direction of force transmission and keeps control hub 11 in its illustrated rest position.

The interior of control hub 11 is hollow and is essentially divided by a step 35 into two chambers 33 and 34. Chamber 33 is axially open towards the atmosphere, the chamber 34 being axially confined by the head of the control hub. In the head of control hub 11 as well as in step 35, two supports are provided for two valve pistons 36 and 37, these supports being coaxial with respect to each other. Around the support, in a circular manner, the head of control hub 11 has a projection 55 which projects into chamber 34, the step 35 having a projection 54 which projects into chamber 33. The support of valve piston 37 has a radial groove 39 which is open towards chamber 34 and which communicates with working chamber 30 via a bore 40. Chamber 34 further communicates with vacuum chamber 31 via a bore 41 which is radially arranged outside and above projection 55. Moreover, valve piston 37 lies directly opposite reaction disk 25 of force-transmitting member 24 with a small play x. Besides a radial groove 42 which is open towards chamber 33, the support of valve piston 36 also has axial grooves 45 which provide an atmospheric connection between chambers 34 and 33. Groove 42 communicates with working chamber 28 via a bore 43 and vacuum chamber 27 communicates with chamber 33 via the bore 44 radially arranged outside and above projection 54. Valve piston 36 is mechanically connected with a non-illustrated pedal by means of a stepped piston rod 46 coaxially projecting from control hub 11. Valve piston 37 is mechanically connected in a rigid manner with valve piston 36 by means of a piston rod 38. Further, chambers 33 and 34 each house plate valves 47 and 48, respectively, which are radially and axially bearing in a sealing manner against steps 49 and 50, respectively, in the housing of control hub 11. Valve plates 57 and 58 reinforced by an insert 51 are penetrated by the piston rods 46 and 38, respectively, with radial play and are sealingly held in abutment against valve pistons 36 and 37 by means of springs 52 and 53, respectively. Spring 52 supports itself at a step of piston rod 46 and spring 53 supports itself at step 35 in the housing of control hub 11. Piston rod 46 is also embraced by a filter 56 which is positively inserted in the housing of control hub 11, thus closing chamber 33 so as to ensure permeability with respect to air.

For the sake of better understanding of the mode of operation of the booster assume that vacuum chamber 27 is coordinated with a vacuum circuit I and that vacuum chamber 31 is coordinated with a vacuum circuit II.

In the illustrated rest position of the vacuum brake booster valve plate 57 rests sealingly against valve piston 36 and valve plate 58 rests sealingly against valve piston 37. Both valve plates then will be at a distance y with respect to projections 54 and 55, respectively. Thus, it is ensured that—with the exception of that portion of chamber 33 which is separated by plate valve 47 and valve piston 36 and which is filled with atmospheric air—all other chambers are evacuated by the two vacuum circuits. Working chamber 30 communicates with vacuum chamber 31 and, hence, with the vacuum circuit II via bore 40, groove 39, projection 55 and bore 41. Working chamber 28 communicates with vacuum chanber 27 and, hence, with the vacuum circuit I via bore 43, groove 42, projection 54 and bore 44. Also, chamber 34 is evacuated by the vacuum circuit I via axial grooves 45. If now the non-illustrated pedal is actuated, piston rod 46 will move axially and, thus, carry along valve pistons 36 and 37 in its movement. Thereby, valve plate 57 will come to rest against projection 54 and valve plate 58 will come to rest against projection 55. Thus, the vacuum circuits I and II will have been separated from the other chambers by means of plate valves 57 and 58. The vacuum booster is now ready for operation.

If valve pistons 36 and 37 are further axially displaced in the direction of force transmission they will lift off valve plates 57 and 58. Thus, the atmospheric pressure may flow from chamber 33 via groove 42 and bore 43 into working chamber 28 and via axial groove 45, chamber 34, groove 39 and bore 40 into working chamber 30. Thereby, a pressure difference will be brought about between working chamber 28 and vacuum chamber 27 as well as between working chamber 30 and vacuum chamber 31. This results in forces acting on walls 21 and 22 in the direction of vacuum chambers 27 and 31. These forces will be transmitted to force-transmitting member 27 via control hub 11 and reaction disk 25. If the booster is fully actuated, all further forces that are applied to the piston rod 46 will directly be passed on to the force-transmitting member 24 via valve piston 36, piston rod 38, valve piston 37 and reaction disk 25. If piston rod 46 returns into the rest position, the valve pistons 36 and 37 will again come to sealingly rest at valve plates 47 and 48, respectively, and the direct communication between the vacuum and working chambers is, thus, restored. The vacuum circuit I will evacuate working chamber 28 as well as chamber 34 and the vacuum circuit II will evacuate working chamber 30. Return spring 32 will return control hub 11 into its initial position.

It should be pointed out that during the assembly of the two components 9 and 10 of control hub 11 means will have to be used that will have no unfavorable influence on the stroke of the vacuum booster. Advantageous embodiments would be, e.g. stepped interlocking components that would be connected by means of a thread or that could be assembled by means of elements which may not be loosened again.

While I have described above the principles of my invention in connection with specific apparatus it is to be clearly understood that this description is made only by way of example and not as a limitation to the scope of my invention as set forth in the objects thereof and in the accompanying claims.

I claim:

1. A two-circuit vacuum brake booster comprising:
a housing having a longitudinal axis;
two pressure chambers disposed one behind the other coaxial of said axis within said housing;
at least one movable wall disposed in each of said two chambers to divide each of said two chambers into a vacuum chamber and a working chamber, each of said movable walls acting on a force-transmitting member; and
a control hub disposed in said housing coaxial of said axis supporting said force-transmitting member and to which each of said movable walls are fastened, said hub having disposed therein a valve and duct system for separate evacuation of and joint supply of atmospheric pressure to said working chamber of each of said two chambers, said hub having only a single inlet coaxial of said axis for said atmospheric pressure to pressurize said working chamber of each of said two chambers.

2. A two-circuit vacuum brake booster comprising:
a housing having a longitudinal axis;
two pressure chambers disposed one behind the other coaxial of said axis within said housing;
at least one movable wall disposed in each of said two chambers to divide each of said two chambers into a vacuum chamber and a working chamber, each of said movable walls acting on a force-transmitting member; and
a control hub disposed in said housing coaxial of said axis supporting said force-transmitting member and to which each of said movable walls are fastened, said hub having disposed therein a valve and duct system for separate evacuation of and joint supply of atmospheric pressure to said working chamber of each of said two chambers;
said valve and duct system including
two valve arrangements each associated with a different one of said working chambers and each having a valve piston, a plate valve and a valve spring, each of said valve pistons being directly operable by a piston rod,
each of said valve arrangements being disposed one behind the other coaxial of said axis, and
each of said valve pistons being rigidly connected with one another by one of said piston rods.

3. A booster according to claim 2, wherein
each of said valve pistons is actuated by the other of said piston rods, and
that one of said valve pistons connected to said other of said piston rods has in that portion of said hub in which it is guided ducts for passage of said atmospheric pressure to the other of said valve arrangements.

4. A booster according to claim 2, wherein
said hub is formed from two axially disposed components.

5. A two-circuit vacuum brake booster comprising:
a housing having a longitudinal axis;
two pressure chambers disposed one behind the other coaxial of said axis within said housing;
at least one movable wall disposed in each of said two chambers to divide each of said two chambers into a vacuum chamber and a working chamber, each of said movable walls acting on a force-transmitting member;
a control hub disposed in said housing coaxial of said axis supporting said force-transmitting member and to which each of said movable walls are fastened, said hub having disposed therein a valve and duct system for separate evacuation of and joint supply of atmospheric pressure to said working chamber of each of said two chambers; and
a substantially annular atmospheric chamber disposed within said housing outside of said hub intermediate said two chambers coaxial of said axis.

6. A booster according to claim 5, wherein
said hub has only a single inlet coaxial of said axis for said atmospheric pressure to pressurize said working chamber of each of said two chambers.

7. A two-circuit vacuum brake booster comprising:
a housing having a longitudinal axis;
two pressure chambers disposed one behind the other coaxial of said axis within said housing;
at least one movable wall disposed in each of said two chambers to divide each of said two chambers into a vacuum chamber and a working chamber, each of said movable walls acting on a force-transmitting member;
a control hub disposed in said housing coaxial of said axis supporting said force-transmitting member and to which each of said movable walls are fastened, said hub having disposed therein a valve and duct system for separate evacuation of and joint supply of atmospheric pressure to said working chamber of each of said two chambers; and
an atmospheric chamber disposed within said housing intermediate said two chambers coaxial of said axis;
said valve and duct system including
two valve arrangement each associated with a different one of said working chambers and each having a valve piston, a plate valve and a valve spring, each of said valve pistons being directly operable by a piston rod, each of said valve arrangements being disposed one behind the other coaxial of said axis, and each of said valve pistons being rigidly connected with one another by one of said piston rods.

8. A booster according to claim 7, wherein each of said valve pistons is actuated by the other of said piston rods, and that one of said valve pistons connected to said other of said piston rods has in that portion of said hub in which it is guided ducts for passage of said atmospheric pressure to the other of said valve arrangements.

9. A booster according to claim 7, wherein said hub is formed from two axially disposed components.

* * * * *